US011935670B1

(12) United States Patent
Ledbetter

(10) Patent No.: US 11,935,670 B1
(45) Date of Patent: Mar. 19, 2024

(54) CONDUCTOR ASSEMBLY SEPARATOR

(71) Applicant: Southwire Company, LLC, Carrollton, GA (US)

(72) Inventor: Scotty Joe Ledbetter, Bowdon, GA (US)

(73) Assignee: Southwire Company, LLC

(*) Notice: Subject to any disclaimer, the term of this patent is extended or adjusted under 35 U.S.C. 154(b) by 0 days.

(21) Appl. No.: 17/822,487

(22) Filed: Aug. 26, 2022

Related U.S. Application Data

(60) Provisional application No. 63/240,199, filed on Sep. 2, 2021.

(51) Int. Cl.
*H01B 7/02* (2006.01)

(52) U.S. Cl.
CPC ...................................... *H01B 7/02* (2013.01)

(58) Field of Classification Search
CPC ......... H01B 11/02; H01B 11/06; H01B 11/08; H01B 7/295; H01B 7/02; H01B 11/002; H01B 3/441; H01B 9/003; H01B 13/06; H01B 11/085; H01B 11/1008; H01B 11/1025; H01B 13/0036; H01B 13/26; H01B 3/445; H01B 7/365; H01B 13/0278; H01B 13/22; H01B 7/0009; H01B 7/18; H01B 7/226; H01B 9/028; H01B 11/04; H01B 11/10; H01B 11/125; H01B 3/30; H01B 3/485; H01B 7/184; H01B 7/292; H01B 7/32; H01B 7/38; H01B 1/04; H01B 11/00; H01B 3/302; H01B 7/0045; H01B 7/17; H01B 7/421; H01B 7/423; H01B 9/005; H01B 1/026; H01B 11/12; H01B 11/1808; H01B 11/1895; H01B 11/22; H01B 13/00; H01B 13/0207; H01B 13/0285; H01B 3/44; H01B 7/0225; H01B 7/1815; H01B 7/285; H01B 7/36; H01B 1/02; H01B 1/24; H01B 11/1058; H01B 11/1834; H01B 11/1847; H01B 13/14; H01B 13/24; H01B 13/322; H01B 13/34; H01B 17/56; H01B 17/58; H01B 19/00; H01B 3/004; H01B 3/421; H01B 3/443; H01B 3/47; H01B 7/009; H01B 7/0208; H01B 7/1805; H01B 7/1825; H01B 7/1875; H01B 7/1895; H01B 7/22; H01B 7/223; H01B 7/225; H01B 7/24; H01B 7/28; H01B 7/361; H01B 7/363; H01B 7/428

See application file for complete search history.

(56) References Cited

U.S. PATENT DOCUMENTS

| | | | | |
|---|---|---|---|---|
| 4,453,031 A * | 6/1984 | Justiss | H01B 11/085 | 174/105 B |
| 4,755,629 A * | 7/1988 | Beggs | H01B 11/02 | 174/34 |

(Continued)

*Primary Examiner* — Krystal Robinson
(74) *Attorney, Agent, or Firm* — Merchant & Gould P.C.

(57) ABSTRACT

A cable with a conductor assembly separator may be provided. The cable may comprise an assembly, a jacket, and a conductor assembly separator comprising an interweave assembly separator. The assembly may comprise a first conductor, a second conductor, and a ground. The interweave assembly separator may be disposed between the first conductor and the ground, the second conductor and the ground, a first side of the assembly and the jacket, and a second side of the assembly and the jacket.

28 Claims, 6 Drawing Sheets

(56) References Cited

U.S. PATENT DOCUMENTS

| | | | | | |
|---|---|---|---|---|---|
| 5,541,361 | A * | 7/1996 | Friesen | H01B 11/06 174/34 |
| 5,565,653 | A * | 10/1996 | Rofidal | H01B 11/02 174/115 |
| 5,789,711 | A * | 8/1998 | Gaeris | H01B 11/02 174/113 C |
| 6,222,130 | B1 * | 4/2001 | Gareis | H01B 11/06 174/113 AS |
| 6,248,954 | B1 * | 6/2001 | Clark | H01B 11/085 174/113 R |
| 6,288,340 | B1 * | 9/2001 | Arnould | H01B 13/2673 174/113 R |
| 9,202,610 | B2 * | 12/2015 | Gould | H01B 3/00 |
| 9,711,261 | B2 * | 7/2017 | Glew | H05K 9/0081 |
| 10,186,350 | B2 * | 1/2019 | Kusuma | H01B 7/0216 |
| 11,081,258 | B1 * | 8/2021 | Cook | G02B 6/4495 |

* cited by examiner

CONDUCTOR ASSEMBLY SEPARATOR

RELATED APPLICATION

Under provisions of 35 U.S.C. § 119(e), Applicant claims the benefit of U.S. Provisional Application No. 63/240,199 filed Sep. 2, 2021, which is incorporated herein by reference.

BACKGROUND

A thermoplastic-sheathed cable (TPS) may comprise a toughened outer sheath of polyvinyl chloride (PVC) thermoplastic, covering one or more individual annealed copper conductors, themselves insulated with PVC. This type of wiring may be used for residential and light commercial construction. The flat version of the cable, with two insulated conductors and an uninsulated earth conductor (all within the outer sheath), is referred to as twin and earth.

Each current carrying conductor may be insulated by an individual thermoplastic sheath, colored to indicate the purpose of the conductor concerned. The protective ground conductor may also be covered with green/yellow (or green only) insulation, although, in some countries, this conductor may be left as bare copper. With cables where the current carrying conductors are of a large Cross Sectional Area (CSA), the protective ground conductor may be smaller, with a lower continuous current carrying capacity. The conductors used may be solid in cross section or multi-stranded.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
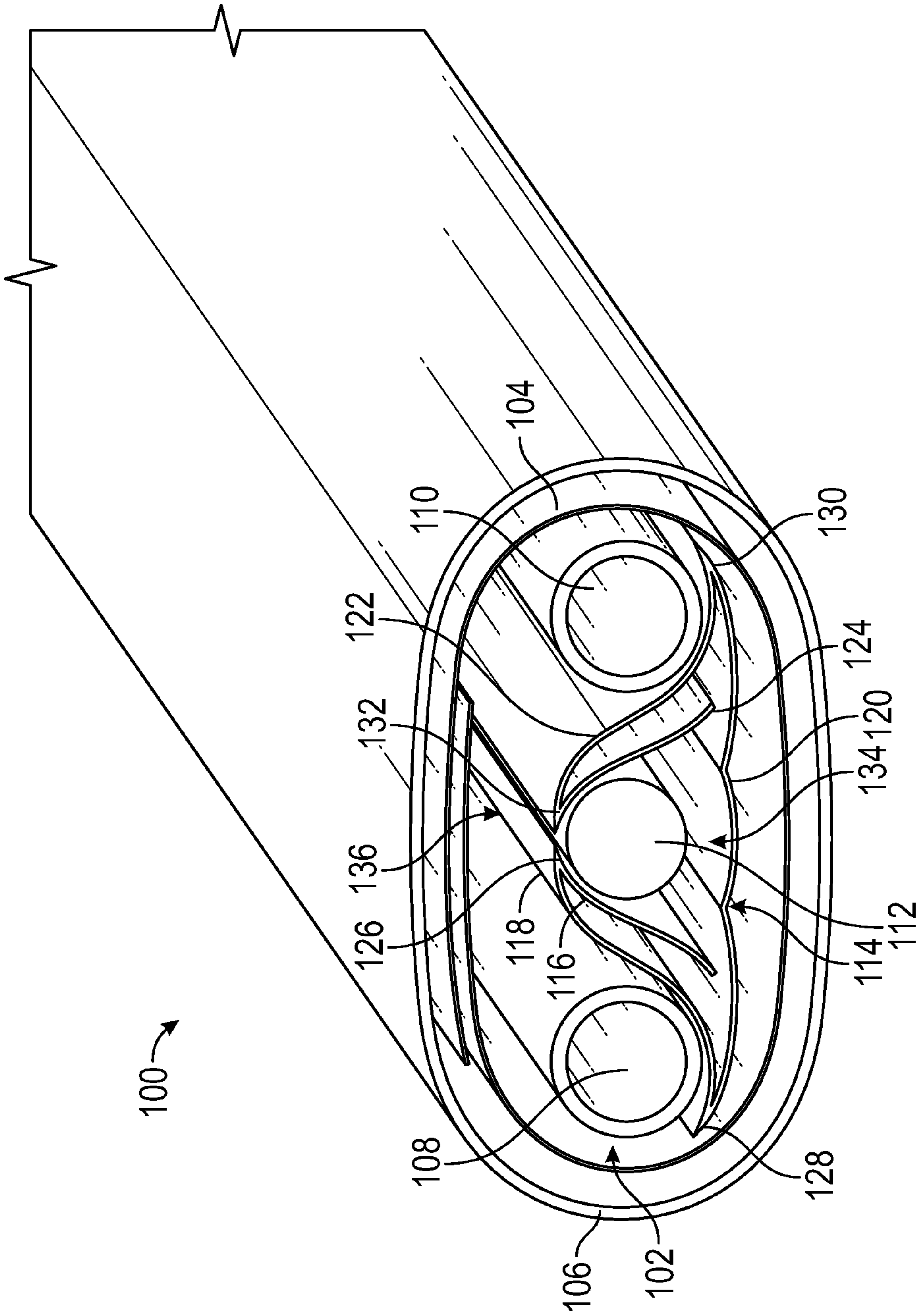
FIG. 1 illustrates a cable with an inter assembly separator.

A cable with a conductor assembly separator may be provided. The cable may comprise an assembly, a jacket, and a conductor assembly separator comprising an interweave assembly separator. The assembly may comprise a first conductor, a second conductor, and a ground. The interweave assembly separator may be disposed between the first conductor and the ground, the second conductor and the ground, a first side of the assembly and the jacket, and a second side of the assembly and the jacket.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates a cable 100 with an inter assembly separator. As shown in FIG. 1, cable 100 may comprise an assembly 102, a dam separator 104, and a jacket 106. Cable 100 may comprise a non-metallic (NM) sheathed cable (e.g., NM-B) that may be used, for example, for both exposed and concealed work in normally dry locations at temperatures not to exceed 90° C. (with ampacity limited to that for 60° C. conductors) as specified in the National Electrical Code (NEC). NM-B is an example and other cables may be used consistent with embodiments of the disclosure.

Assembly 102 may comprise a first conductor 108, a second conductor 110, and a ground 112. First conductor 108 may be insulated and may comprise, but is not limited to, American Wire Gage (AWG) 12 Thermoplastic High Heat-resistant Nylon-coated (THHN) copper wire with black insulation. Second conductor 110 may be insulated and may comprise, but is not limited to, AWG 12 THHN copper wire with white insulation. And ground 112 may comprise, but is not limited to, an AWG 12 bare or insulated copper wire. First conductor 108, second conductor 110, and ground 112 are not limited to solid copper and may be stranded or may comprise any conductive metal or non-metal material. Furthermore, first conductor 108, second conductor 110, and ground 112 are not limited to AWG 12 THHN and may comprise other sizes and types. Jacket 106 may cover assembly 102 and may comprise a non-metallic material such as Polyvinyl Chloride (PVC) for example. Dam separator 104 may wrap around assembly 102 and may overlap. Dam separator 104 may be disposed between jacket 106 and assembly 102 over a separator or, in some embodiments, between separators and assembly 102. Dam separator 104 may comprise, but is not limited to paper.

As shown in FIG. 1, an inter assembly separator 114 may be disposed in cable 100. Inter assembly separator 114, for example, may comprise paper or any other suitable material and may be disposed between the elements comprising assembly 102. Inter assembly separator 114 may be, but is not limited to, 5 mils thick. For example, inter assembly separator 114 may be folded along creases by a folding device and then disposed between the elements comprising assembly 102 during the assembly or manufacture of cable 100.

Inter assembly separator 114, for example, may be disposed between first conductor 108 and ground 112, second conductor 110 and ground 112, and a side of the assembly 102 and jacket 106. As shown in FIG. 1, inter assembly separator 114 may comprise inter assembly separator first section 116, inter assembly separator second section 118, inter assembly separator third section 120, inter assembly separator fourth section 122, inter assembly separator fifth section 124, inter assembly separator first crease 126, inter assembly separator second crease 128, inter assembly separator third crease 130, and inter assembly separator fourth crease 132. Assembly 102 may comprise a first side 134 and a second side 136.

While FIG. 1 shows inter assembly separator second crease 128 and inter assembly separator third crease 130 extending up to or past an outside of first conductor 108 and second conductor 110 respectively, embodiments of the disclosure are not limited to this. For example, inter assembly separator second crease 128 and inter assembly separator third crease 130 may extending up to a "six o'clock" position on first conductor 108 and second conductor 110 respectively or even further to extend up to or even around the outside of first conductor 108 and second conductor 110 respectively.

Inter assembly separator 114 being disposed between first conductor 108 and ground 112 may comprise inter assembly separator first section 116 and inter assembly separator second section 118 being disposed between first conductor 108 and ground 112. Inter assembly separator first section 116 and inter assembly separator second section 118 may be folded along inter assembly separator first crease 126.

Inter assembly separator 114 being disposed between the side (e.g., first side 134) of assembly 102 and jacket 106 may comprise inter assembly separator second section 118 and inter assembly separator third section 120 being disposed between first conductor 108 and jacket 106. Inter assembly separator second section 118 and inter assembly separator third section 120 may be folded along inter assembly separator second crease 128.

Inter assembly separator 114 being disposed between the side (e.g., first side 134) of assembly 102 and jacket 106 may comprise inter assembly separator third section 120 and inter assembly separator fourth section 122 being disposed between second conductor 110 and jacket 106. Inter assembly separator third section 120 and inter assembly separator fourth section 122 may be folded along inter assembly separator third crease 130.

Inter assembly separator 114 being disposed between second conductor 110 and ground 112 comprises inter assembly separator fourth section 122 and inter assembly separator fifth section 124 being disposed between second conductor 110 and ground 112. Inter assembly separator fourth section 122 and inter assembly separator fifth section 124 may be folded along inter assembly separator fourth crease 132.

Figure 2:
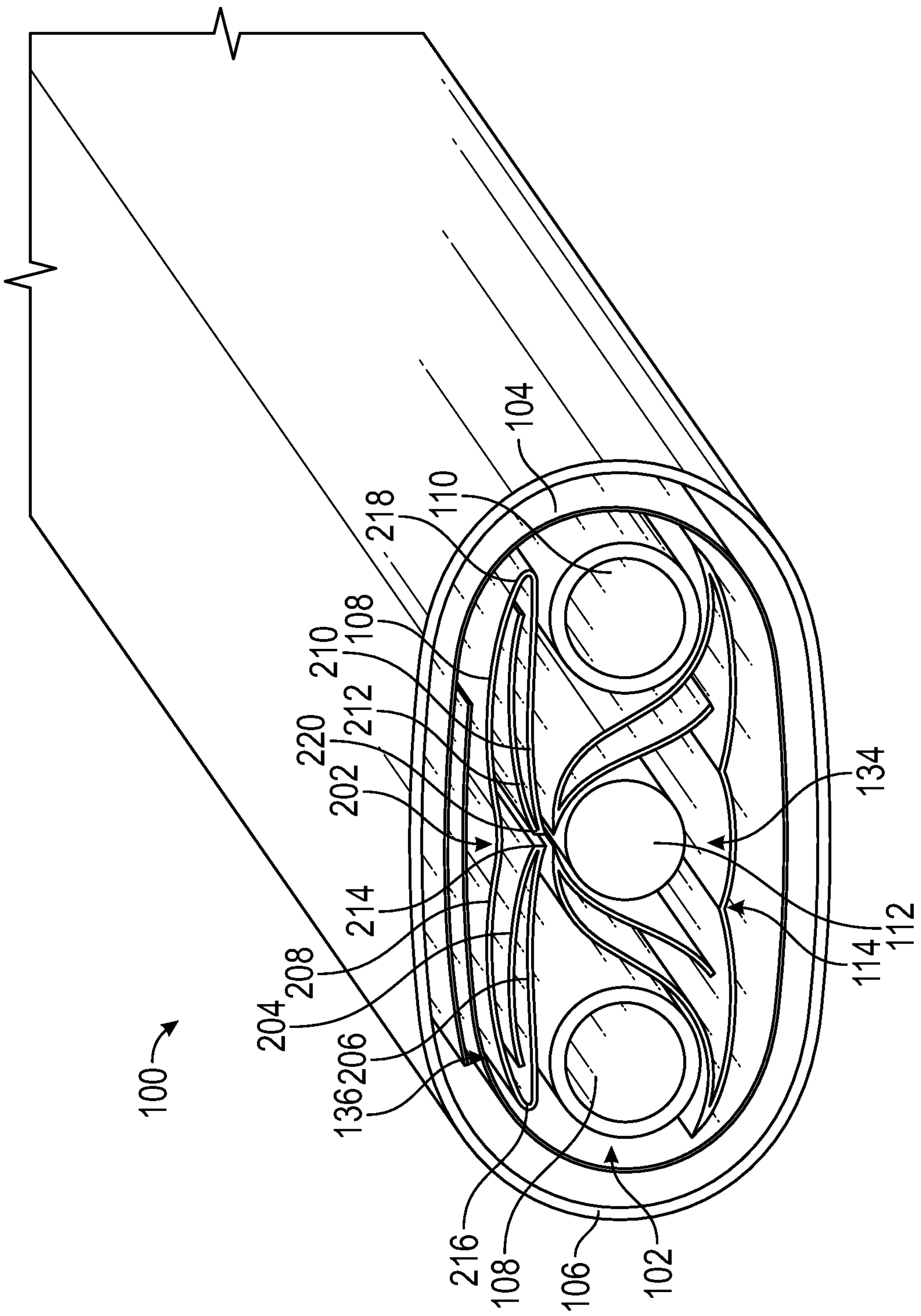
FIG. 2 illustrates a cable with an outer assembly separator.

FIG. 2 illustrates cable 100 with an outer assembly separator 202. As shown in FIG. 2, cable 100 may comprise assembly 102, dam separator 104, and jacket 106 as described above with respect to FIG. 1. As shown in FIG. 2, outer assembly separator 202 may be disposed in cable 100. Outer assembly separator 202, for example, may comprise paper or any other suitable material and may be disposed between the elements comprising assembly 102. Outer assembly separator 202 may be, but is not limited to, 5 mils thick. For example, outer assembly separator 202 may be folded along creases by a folding device and then disposed between the elements comprising assembly 102 during the assembly or manufacture of cable 100.

As shown in FIG. 2, outer assembly separator 202 may be disposed between a side (e.g., first side 134 or second side 136) of assembly 102 and jacket 106. Outer assembly separator 202 may comprise an outer assembly separator first section 204, an outer assembly separator second section 206, an outer assembly separator third section 208, an outer assembly separator fourth section 210, an outer assembly separator fifth section 212, an outer assembly separator first crease 214, an outer assembly separator second crease 216, an outer assembly separator third crease 218, an outer assembly separator fourth crease 220.

The outer assembly separator 202 being disposed between the side of assembly 102 and jacket 106 may comprise outer assembly separator first section 204 being disposed between first conductor 108 and jacket 106. Outer assembly separator 202 being disposed between the side of assembly 102 and jacket 106 may comprise outer assembly separator second section 206 being disposed between first conductor 108 and jacket 106. Outer assembly separator first section 204 and outer assembly separator second section 206 may be folded along outer assembly separator first crease 214.

Outer assembly separator 202 being disposed between the side of assembly 102 and jacket 106 may comprise outer assembly separator third section 208 being disposed between first conductor 108 and jacket 106. Outer assembly separator second section 206 and outer assembly separator third section 208 may be folded along outer assembly separator second crease 216.

Outer assembly separator 202 being disposed between the side of assembly 102 and jacket 106 may outer assembly separator third section 208 being disposed between second conductor 110 and jacket 106. Outer assembly separator 202 being disposed between the side of assembly 102 and jacket 106 may comprise outer assembly separator fourth section 210 being disposed between second conductor 110 and jacket 106. Outer assembly separator third section 208 and outer assembly separator fourth section 210 may be folded along outer assembly separator third crease 218.

Outer assembly separator 202 being disposed between the side of assembly 102 and jacket 106 may comprise an outer assembly separator fifth section 212 being disposed between second conductor 110 and jacket 106. Outer assembly separator fourth section 210 and outer assembly separator fifth section 212 may be folded along outer assembly separator fourth crease 220.

Figure 3:
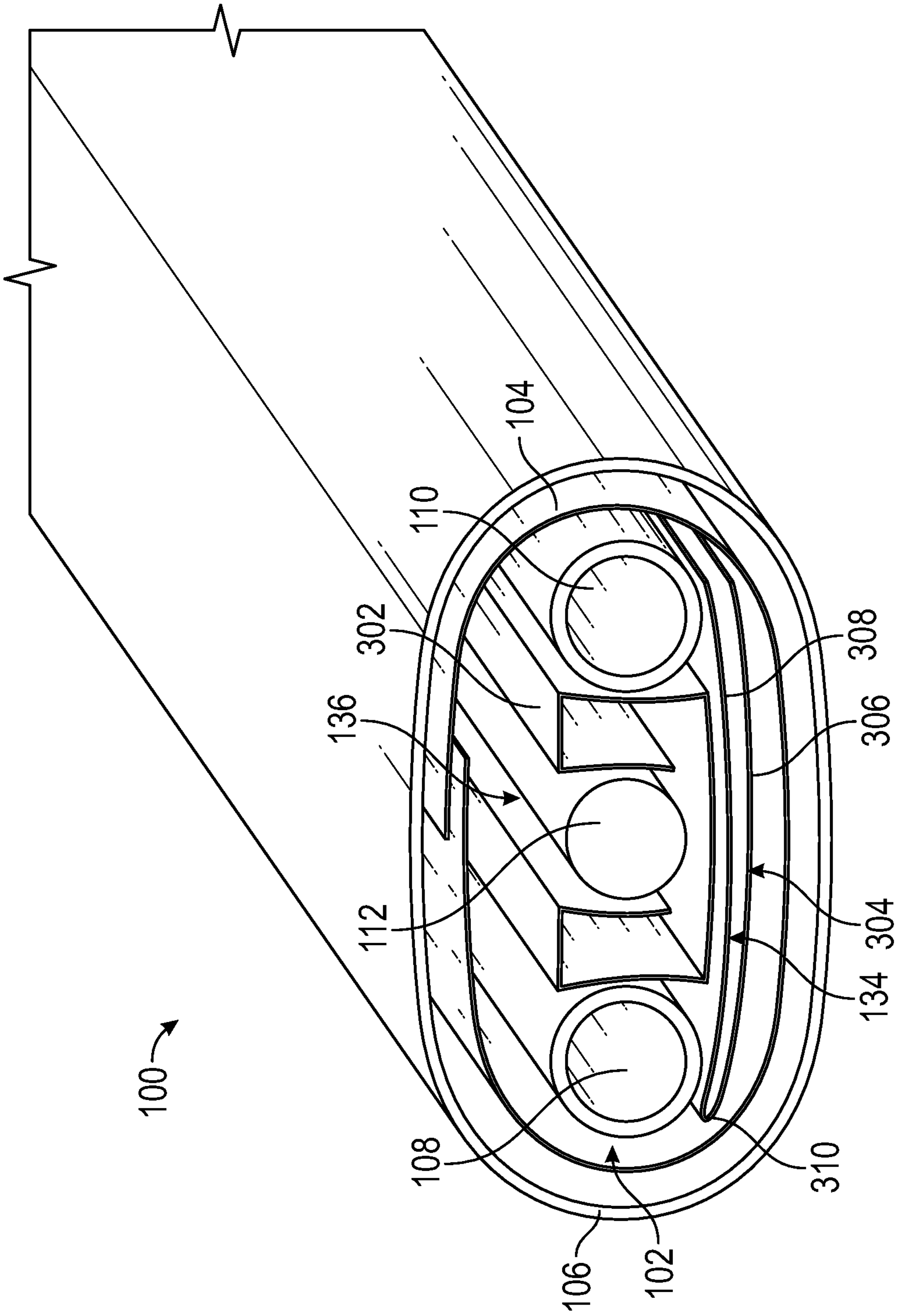
FIG. 3 illustrates a cable with a ground assembly separator and a first outer assembly separator.

FIG. 3 illustrates cable 100 with a ground separator 302 and a first outer assembly separator 304. As shown in FIG. 3, cable 100 may comprise assembly 102, dam separator 104, and jacket 106 as described above with respect to FIG. 1. As shown in FIG. 3, ground separator 302 and first outer assembly separator 304 may be disposed in cable 100. Ground separator 302 and first outer assembly separator 304, for example, may comprise paper or any other suitable material and may be disposed between the elements comprising assembly 102. Ground separator 302 and first outer assembly separator 304 may be, but is not limited to, 5 mils thick. For example, ground separator 302 and first outer assembly separator 304 may be folded along creases by a folding device and then disposed between the elements comprising assembly 102 during the assembly or manufacture of cable 100.

As shown in FIG. 3, ground separator 302 may be disposed around ground 112 and first outer assembly separator 304 may be disposed between a side (e.g., first side 134 or second side 136) of assembly 102 and jacket 106. First outer assembly separator 304 may comprise a first outer assembly separator first section 306 and a first outer assembly separator second section 308 folded along a first outer assembly separator first crease 310. While FIG. 3 shows first outer assembly separator 304 comprising two folds, first outer assembly separator 304 may comprise any number of folds and is not limited to two.

Figure 4:
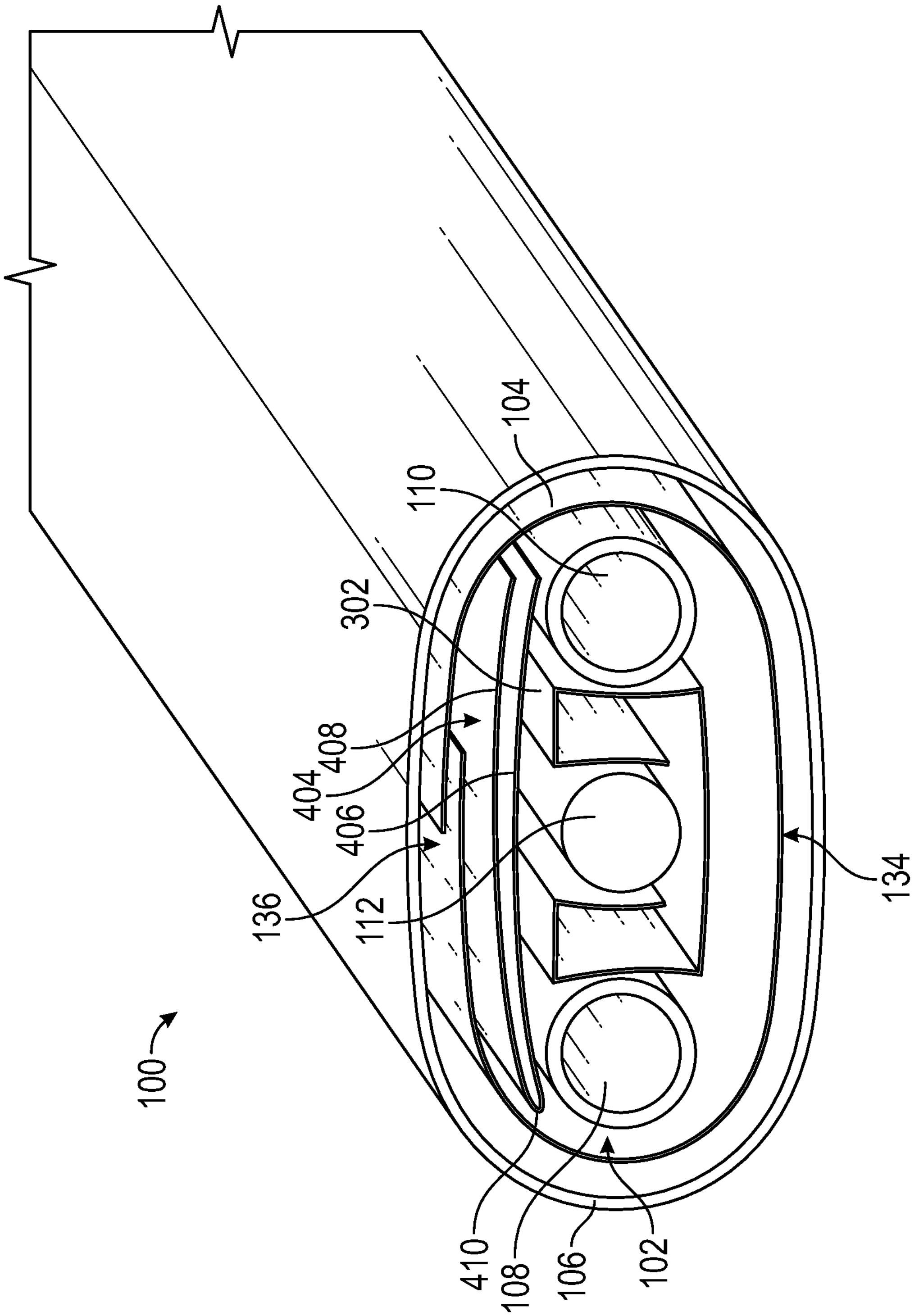
FIG. 4 illustrates a cable with a ground assembly separator and a second outer assembly separator.

FIG. 4 illustrates cable 100 with a ground separator 402 and a second outer assembly separator 404. As shown in FIG. 4, cable 100 may comprise assembly 102, dam separator 104, and jacket 106 as described above with respect to FIG. 1. As shown in FIG. 4, ground separator 302 and second outer assembly separator 404 may be disposed in cable 100. Ground separator 402 and second outer assembly separator 404, for example, may comprise paper or any other suitable material and may be disposed between the elements comprising assembly 102. Ground separator 402 and second outer assembly separator 404 may be, but is not limited to, 5 mils thick. For example, ground separator 402 and second outer assembly separator 404 may be folded along creases by a folding device and then disposed between the elements comprising assembly 102 during the assembly or manufacture of cable 100.

As shown in FIG. 4, ground separator 402 may be disposed around ground 112 and second outer assembly separator 404 may be disposed between a side (e.g., first side 134 or second side 136) of assembly 102 and jacket 106. Second outer assembly separator 404 may comprise a second outer assembly separator first section 406 and a second outer assembly separator second section 408 folded along a second outer assembly separator second crease 410. While FIG. 4 shows second outer assembly separator 404 comprising two folds, second outer assembly separator 404 may comprise any number of folds and is not limited to two.

Figure 5:
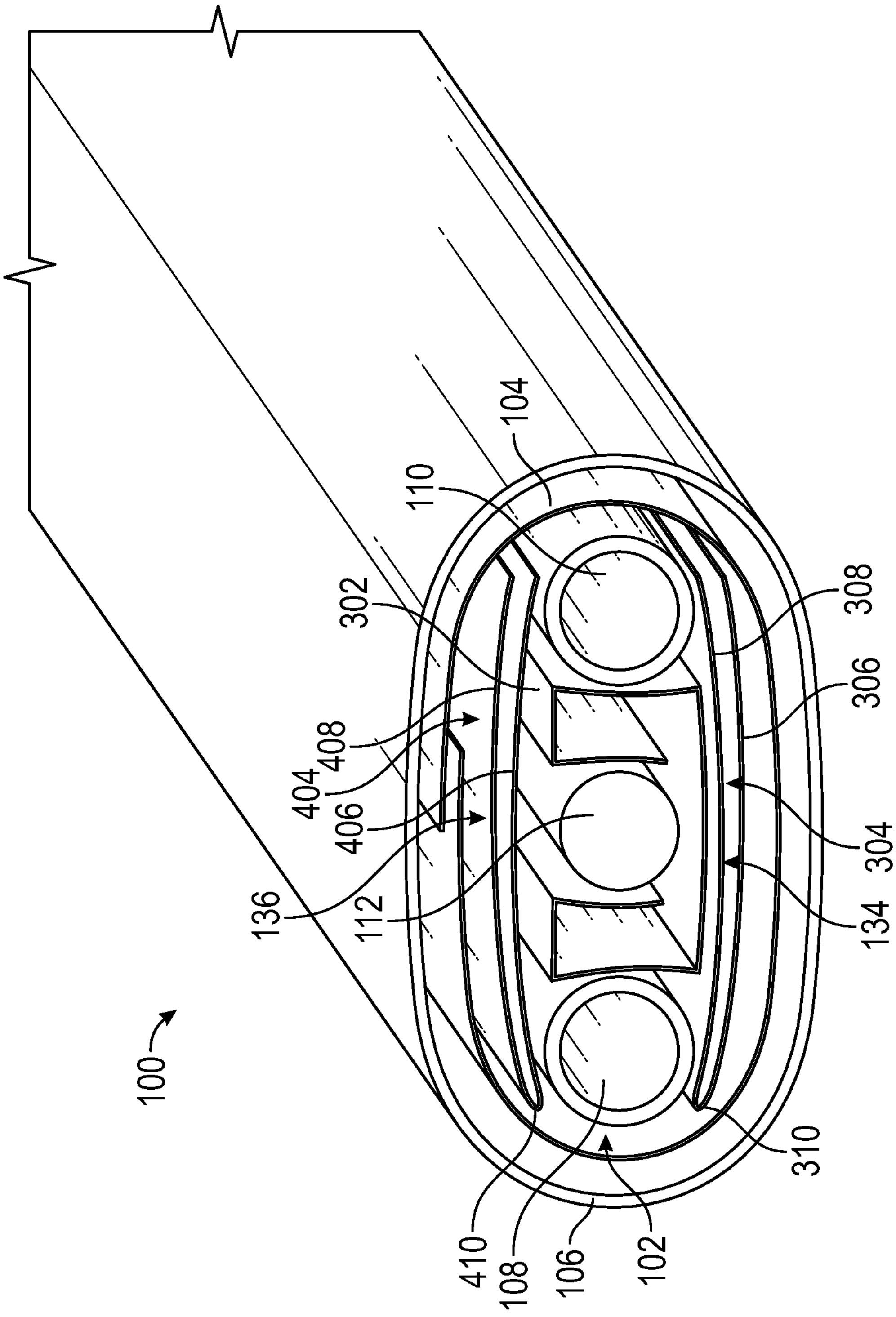
FIG. 5 illustrates a cable with a ground assembly separator, a first outer assembly separator, and a second outer assembly separator.

FIG. 5 illustrates cable 100 with ground separator 302, first outer assembly separator 304, and second outer assembly separator 404. In other words, FIG. 5 illustrates cable 100 having both first outer assembly separator 304 and second outer assembly separator 404.

Figure 6:
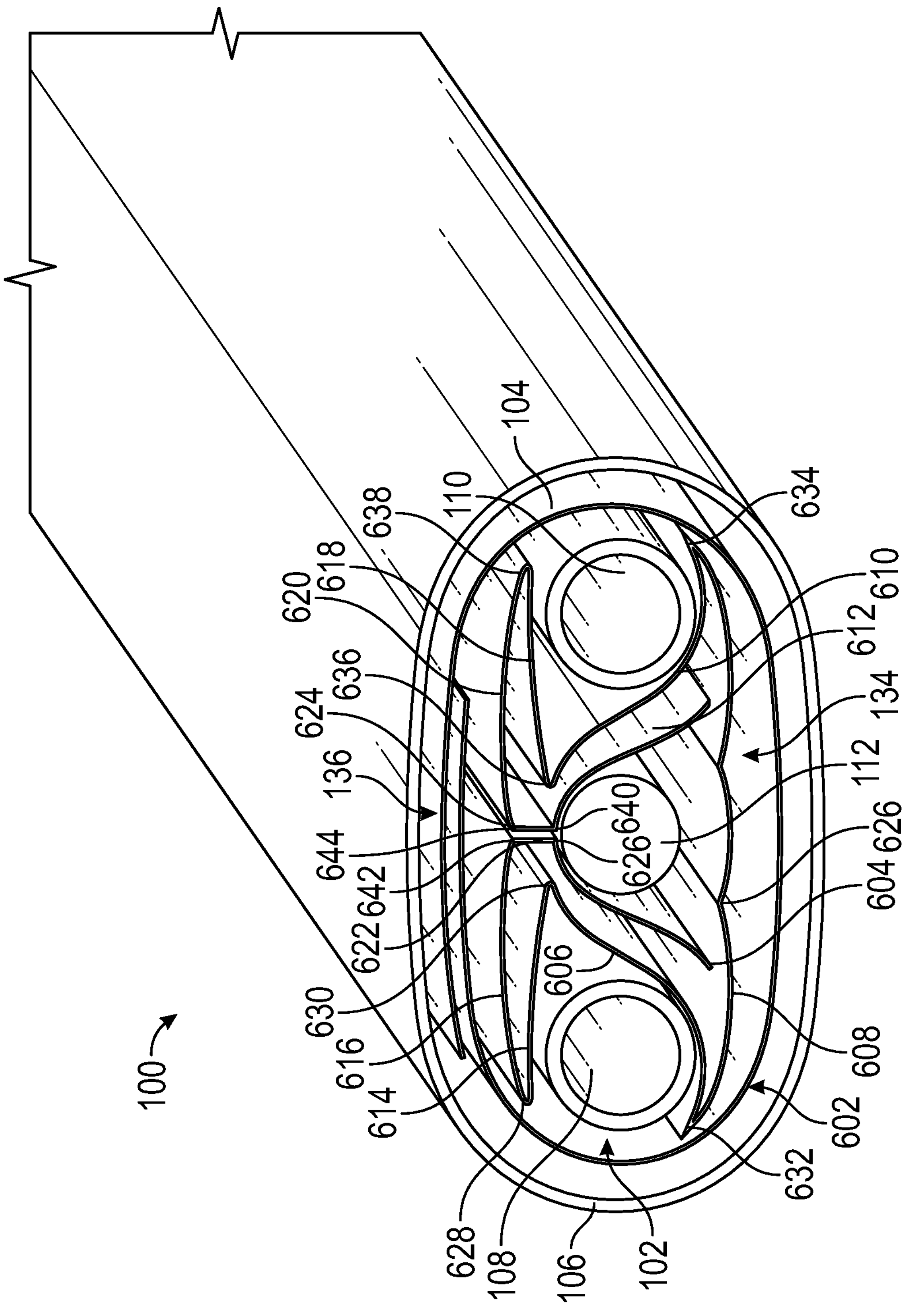
FIG. 6 illustrates a cable with an interweave assembly separator.

FIG. 6 illustrates cable 100 with an interweave assembly separator 602. As shown in FIG. 6, cable 100 may comprise assembly 102, dam separator 104, and jacket 106 as described above with respect to FIG. 6. As shown in FIG. 6, interweave assembly separator 602 may be disposed in cable 100. Interweave assembly separator 602, for example, may comprise paper or any other suitable material and may be disposed between the elements comprising assembly 102. Interweave assembly separator 602 may be, but is not limited to, 5 mils thick. For example, Interweave assembly separator 602 may be folded along creases by a folding device and then disposed between the elements comprising assembly 102 during the assembly or manufacture of cable 100.

As shown in FIG. 6, interweave assembly separator 602 may be disposed between first conductor 108 and ground 112, second conductor 110 and ground 112, first side 134 of assembly 102 and jacket 106, and second side 136 of assembly 102 and jacket 106. Interweave assembly separator 602 may comprise interweave assembly separator first section 604, interweave assembly separator second section 606, interweave assembly separator third section 608, interweave assembly separator fourth section 610, interweave assembly separator fifth section 612, interweave assembly separator sixth section 614, interweave assembly separator seventh section 616, interweave assembly separator eighth section 618, interweave assembly separator nineth section 620, interweave assembly separator tenth section 622, interweave assembly separator eleventh section 624, interweave assembly separator first crease 626, interweave assembly separator second crease 628, interweave assembly separator third crease 630, interweave assembly separator fourth crease 632, interweave assembly separator fifth crease 634, interweave assembly separator sixth crease 636, interweave assembly separator seventh crease 638, interweave assembly separator eighth crease 640, interweave assembly separator ninth crease 642, and interweave assembly separator tenth crease 644.

As stated above, interweave assembly separator 602 may be folded along creases by a folding device and then disposed between the elements comprising assembly 102 during the assembly or manufacture of cable 100. For example, interweave assembly separator 602 being disposed between first conductor 108 and ground 112 comprises interweave assembly separator first section 604 and interweave assembly separator second section 606 being disposed between first conductor 108 and ground 112. Interweave assembly separator 602 being disposed between first side 134 of assembly 102 and jacket 106 comprises interweave assembly separator second section 606 and interweave assembly separator third section 608 being disposed between first conductor 108 and jacket 106. Interweave assembly separator 602 being disposed between first side 134 of assembly 102 and jacket 106 comprises interweave assembly separator third section 608 and interweave assembly separator fourth section 610 being disposed between second conductor 110 and jacket 106. Interweave assembly separator 602 being disposed between second conductor 110 and ground 112 comprises interweave assembly separator fourth section 610 and interweave assembly separator fifth section 612 being disposed between second conductor 110 and ground 112. Interweave assembly separator 602 being disposed between second side 136 of assembly 102 and jacket 106 comprises interweave assembly separator sixth section 614 and interweave assembly separator seventh section 616 being disposed between first conductor 108 and jacket 106. Interweave assembly separator 602 being disposed between second side 136 of assembly 102 and jacket 106 comprises interweave assembly separator eighth section 618 and interweave assembly separator nineth section 620 being disposed between second conductor 110 and jacket 106.

Moreover, interweave assembly separator 602 may be folded along creases by the folding device and then disposed between the elements comprising assembly 102 during the assembly or manufacture of cable 100. For example, interweave assembly separator first section 604 and interweave assembly separator tenth section 622 may be holder along interweave assembly separator first crease 626. Interweave assembly separator tenth section 622 and interweave assembly separator seventh section 616 may be holder along interweave assembly separator ninth crease 642. Interweave assembly separator seventh section 616 and interweave assembly separator sixth section 614 may be holder along interweave assembly separator second crease 628. Interweave assembly separator sixth section 614 and interweave assembly separator second section 606 may be holder along interweave assembly separator third crease 630. Interweave assembly separator second section 606 and interweave assembly separator third section 608 may be holder along interweave assembly separator fourth crease 632. Interweave assembly separator third section 608 and interweave assembly separator fourth section 610 may be holder along interweave assembly separator fifth crease 634. Interweave assembly separator fourth section 610 and interweave assembly separator eighth section 618 may be holder along interweave assembly separator sixth crease 636. Interweave assembly separator eighth section 618 and interweave assembly separator nineth section 620 may be holder along interweave assembly separator seventh crease 638. Interweave assembly separator nineth section 620 and interweave assembly separator eleventh section 624 may be holder along interweave assembly separator tenth crease 644. Interweave assembly separator eleventh section 624 and interweave assembly separator fifth section 612 may be holder along interweave assembly separator eighth crease 640.

Consistent with embodiments of the disclosure, interweave assembly separator tenth section 622 (along with interweave assembly separator ninth crease 642) and interweave assembly separator eleventh section 624 (along with interweave assembly separator tenth crease 644) may not be included in interweave assembly separator 602. In these embodiments, interweave assembly separator first section 604 may fold with interweave assembly separator seventh section 616 along interweave assembly separator first crease 626 and interweave assembly separator fourth section 610 may fold with interweave assembly separator nineth section 620 along interweave assembly separator eighth crease 640.

Separators consistent with embodiments of the disclosure (e.g., inter assembly separator 114, outer assembly separator 202, first outer assembly separator 304, second outer assembly separator 404, and interweave assembly separator 602) may provide a cable (e.g., cable 100) with a greater mechanical integrity performance (e.g., greater crush resistance) than conventional systems. For example, separators consistent with embodiments of the disclosure may provide a greater flat crush resistance and a greater edge crush resistance under American National Standards Institute (ANSI)/Underwriters Laboratories (UL) 719 crush tests. Moreover, multiple separators of any type as described above may be placed in parallel and adjacent to each other along the length of cable 100 consistent with embodiments of the disclosure.

Furthermore, separators consistent with embodiments of the disclosure (e.g., inter assembly separator 114, outer assembly separator 202, first outer assembly separator 304, second outer assembly separator 404, and interweave assembly separator 602) may have, but are not limited to, a range of width between fifteen sixtieths inches to one and five eights inches inclusively. Furthermore, separators consistent with embodiments of the disclosure (e.g., inter assembly separator 114, outer assembly separator 202, first outer assembly separator 304, second outer assembly separator 404, and interweave assembly separator 602) may have a thickness of, but not limited to, a range of width between 2.8 mils and 6 mils inclusively. Moreover, separators consistent with embodiments of the disclosure (e.g., inter assembly separator 114, outer assembly separator 202, first outer assembly separator 304, second outer assembly separator 404, and interweave assembly separator 602) may comprise, but are not limited to, paper having a paper weight of between 35 pounds and 80 pounds. The paper may comprise, but is not limited to, smooth craft paper of crepe paper.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
an assembly comprising;
a first conductor,
a second conductor, and
a ground disposed between the first conductor and the second conductor;
a jacket; and
an inter assembly separator disposed between the first conductor and the ground, the second conductor and the ground, and a side of the assembly and the jacket wherein the inter assembly separator is folded at a plurality of creases.

2. The apparatus of claim 1, wherein the inter assembly separator being disposed between the first conductor and the ground comprises an inter assembly separator first section and an inter assembly separator second section being disposed between the first conductor and the ground.

3. The apparatus of claim 2, wherein the inter assembly separator first section and the inter assembly separator second section is folded along an inter assembly separator first crease.

4. The apparatus of claim 1, wherein the inter assembly separator being disposed between the side of the assembly and the jacket comprises an inter assembly separator second section and an inter assembly separator third section being disposed between the first conductor and the jacket.

5. The apparatus of claim 4, wherein the inter assembly separator second section and the inter assembly separator third section is folded along an inter assembly separator second crease.

6. The apparatus of claim 1, wherein the inter assembly separator being disposed between the side of the assembly and the jacket comprises an inter assembly separator third section and an inter assembly separator fourth section being disposed between the second conductor and the jacket.

7. The apparatus of claim 6, wherein the inter assembly separator third section and the inter assembly separator fourth section is folded along an inter assembly separator third crease.

8. The apparatus of claim 1, wherein the inter assembly separator being disposed between the second conductor and the ground comprises an inter assembly separator fourth section and an inter assembly separator fifth section being disposed between the second conductor and the ground.

9. The apparatus of claim 8, wherein the inter assembly separator fourth section and the inter assembly separator fifth section is folded along an inter assembly separator fourth crease.

10. The apparatus of claim 1, wherein inter assembly separator not being disposed between a second side of the assembly and the jacket.

11. An apparatus comprising:
an assembly comprising;
a first conductor,
a second conductor, and
a ground disposed between the first conductor and the second conductor;
a jacket; and
an outer assembly separator disposed between a side of the assembly and the jacket wherein the outer assembly separator is folded at a plurality of creases.

12. The apparatus of claim 11, wherein the outer assembly separator being disposed between the side of the assembly and the jacket comprises an outer assembly separator first section being disposed between the first conductor and the jacket.

13. The apparatus of claim 12, wherein the outer assembly separator being disposed between the side of the assembly and the jacket comprises an outer assembly separator second section being disposed between the first conductor and the jacket.

14. The apparatus of claim 13, wherein the outer assembly separator first section and the outer assembly separator second section is folded along an outer assembly separator first crease.

15. The apparatus of claim 14, wherein the outer assembly separator being disposed between the side of the assembly and the jacket comprises an outer assembly separator third section being disposed between the first conductor and the jacket.

16. The apparatus of claim 15, wherein the outer assembly separator second section and the outer assembly separator third section is folded along an outer assembly separator second crease.

17. The apparatus of claim 16, wherein the outer assembly separator being disposed between the side of the assembly and the jacket comprises the outer assembly separator third section being disposed between the second conductor and the jacket.

18. The apparatus of claim 17, wherein the outer assembly separator being disposed between the side of the assembly and the jacket comprises an outer assembly separator fourth section being disposed between the second conductor and the jacket.

19. The apparatus of claim 18, wherein the outer assembly separator third section and the outer assembly separator fourth section is folded along an outer assembly separator third crease.

20. The apparatus of claim 19, wherein the outer assembly separator being disposed between the side of the assembly and the jacket comprises an outer assembly separator fifth section being disposed between the second conductor and the jacket.

21. The apparatus of claim 20, wherein the outer assembly separator fourth section and the outer assembly separator fifth section is folded along an outer assembly separator fourth crease.

22. An apparatus comprising:
an assembly comprising;
a first conductor,
a second conductor, and
a ground;
a jacket; and
an interweave assembly separator disposed between the first conductor and the ground, the second conductor and the ground, a first side of the assembly and the jacket, and a second side of the assembly and the jacket.

23. The apparatus of claim 22, wherein the interweave assembly separator being disposed between the first conductor and the ground comprises an interweave assembly separator first section and an interweave assembly separator second section being disposed between the first conductor and the ground.

24. The apparatus of claim 22, wherein the interweave assembly separator being disposed between the first side of the assembly and the jacket comprises an interweave assembly separator second section and an interweave assembly separator third section being disposed between the first conductor and the jacket.

25. The apparatus of claim 22, wherein the interweave assembly separator being disposed between the first side of the assembly and the jacket comprises an interweave assembly separator third section and an interweave assembly separator fourth section being disposed between the second conductor and the jacket.

26. The apparatus of claim 22, wherein the interweave assembly separator being disposed between the second conductor and the ground comprises an interweave assembly separator fourth section and an interweave assembly separator fifth section being disposed between the second conductor and the ground.

27. The apparatus of claim 22, wherein the interweave assembly separator being disposed between the second side of the assembly and the jacket comprises an interweave assembly separator sixth section and an interweave assembly separator seventh section being disposed between the first conductor and the jacket.

28. The apparatus of claim 22, wherein the interweave assembly separator being disposed between the second side of the assembly and the jacket comprises an interweave assembly separator eighth section and an interweave assembly separator nineth section being disposed between the second conductor and the jacket.

* * * * *